United States Patent

[11] 3,578,850

[72] Inventor Alan H. Grant
3208 Woodhollow Drive, Chevy Chase, Md. 20015
[21] Appl. No. 10,592
[22] Filed Feb. 11, 1970
[45] Patented May 18, 1971
Continuation of application Ser. No. 707,784, Feb. 23, 1968, now abandoned.

[54] ANTI-FLARE CONTACT LENS
2 Claims, 11 Drawing Figs.
[52] U.S. Cl. ................................................. 351/160,
351/177, 51/284, 51/320
[51] Int. Cl. ............................................... G02c 7/04
[50] Field of Search ......................................... 351/160,
177; 51/(Inquired), 284, 320

[56] References Cited
UNITED STATES PATENTS
| | | | |
|---|---|---|---|
| 2,288,143 | 6/1942 | Sheppard | 356/207 |
| 3,228,741 | 1/1966 | Becker | 351/160 |
| 3,339,318 | 9/1967 | Graf et al. | 51/284 |

FOREIGN PATENTS
1,115,140 12/1955 France

OTHER REFERENCES
Haynes, Article in ENCYCLOPEDIA OF CONTACT LENS PRACTICE, Chapter XXV, July 1, 1960, pgs. 6— 12 cited Primary Examiner—David H. Rubin
Attorney—Berman, Davidson and Berman ABSTRACT: Contact lens, together with process and apparatus for making the contact lens, which has an annular surface area of irregular or waffled conformation for precluding the transmission of light therethrough.

PATENTED MAY 18 1971          3,578,850

INVENTOR.
ALAN H. GRANT,
BY
ATTORNEYS.

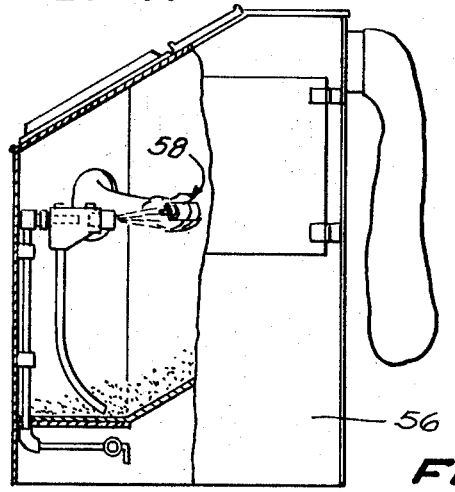
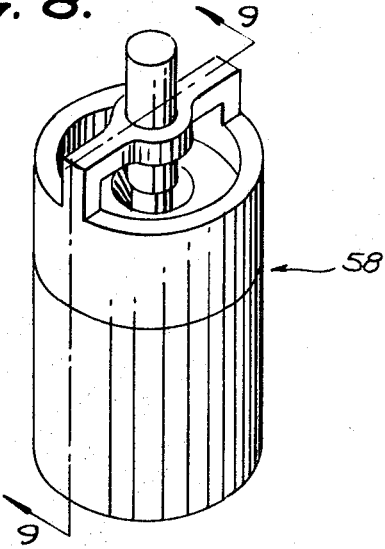
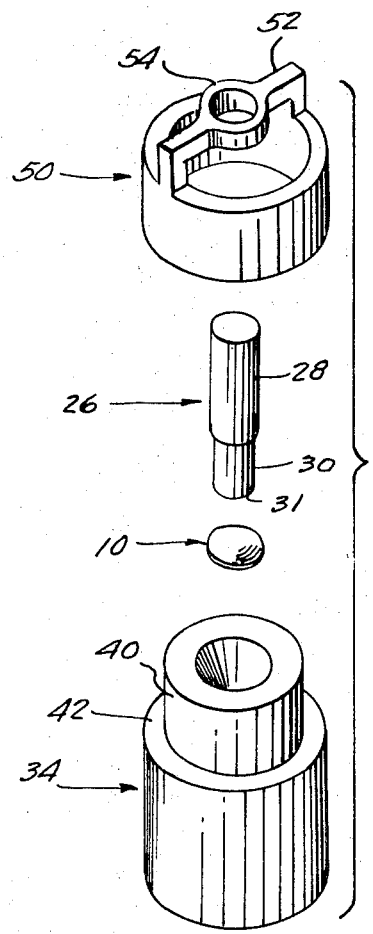
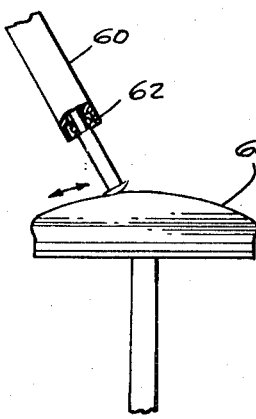
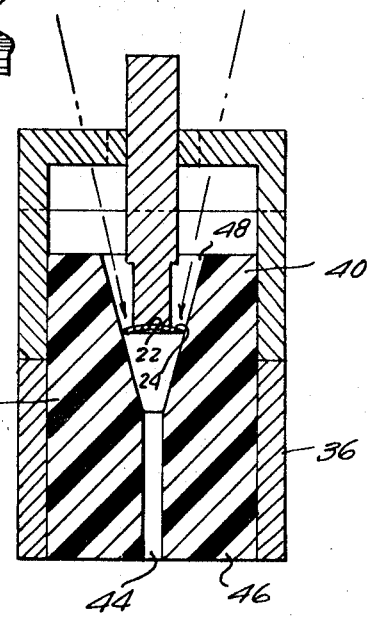
INVENTOR.
ALAN H. GRANT,
BY
Berman, Davidson & Berman
ATTORNEYS.

ANTI-FLARE CONTACT LENS

This application is a continuation of pending application, Ser. No. 707,784, filed Feb. 23, 1968 and now abandoned.

This invention relates to all known contact lenses, including corneal and scleral types, and in particular, to a novel contact lens and a process and apparatus for producing such lenses.

In contact lens prosthetics, much effort has been exerted to improve the comfort of the wearer as well as the optical quality of the lenses. However, none of the lenses heretofore devised has resolved a chronic problem experienced by virtually all contact lens wearers, namely, the phenomenon known as "flare" or "ghosting." This phenomenon is often characterized by wearers as "seeing a clear image through the center of the contact lens surrounded partially by a halo of light."

Contact lenses normally have a central optic zone or area encircled by a nonoptic peripheral zone or area, the latter being principally for drainage and exchange of the lacrimal fluid. Frequently, some of the incident light striking the contact lens will pass through the nonoptic zone and stimulate the retina of the eye. It is theorized that this extraneous light is the cause of "flare" or "ghosting." Even after fully adapting to the physical presence of contact lenses and learning to ignore "flare," the wearer may still complain about "ghosting" of images while driving at night or while reading.

This phenomenon should not occur if the optic zone of the lens is in direct alignment with and corresponds in size to the pupil. Since these conditions are seldom present, it is believed that "flare" or "ghosting" results from the following two factors, either individually or collectively. First, a corneal contact lens is rarely positioned over the central portion of the cornea to correspond to the pupillary aperture of the eye. Because the contact lens is fitted flatter than, parallel to, or steeper than the flattest meridian of the cornea, it will ride either "high" or "low" between blinks of the eye lids, and also will vary in position on the eye, moving essentially upward and downward in response to blinking of the lids. Displacement may also occur due to the particular corneal topography and lid motion during blinking. Second, the pupil of the eye varies in size from an average minimum of 2.0 millimeters in bright light to an average maximum of 5.5 millimeters in dim illumination. Assuming the contact lens has been fitted with an optic zone corresponding in size to the pupil in one type of illumination, an increase in size of the pupil due to less illumination will permit the entry of light which has passed through the nonoptic zone since the optic zone of the lens remains constant.

If contact lenses are fitted with sufficiently large optic zones to eliminate flare by covering the pupillary area regardless of the extent of its increase in size, the contact lens may become unwearable due to being too tight on the eye, thereby precluding the proper lacrimal interchange during the blinking process.

In the case of scleral contact lenses in which there is little or no movement during blinking, "flare" frequently occurs because the optic zone must be relatively small in order to prevent the lens from becoming too tight on the eye. Increasing the optic zone in scleral lenses frequently results in discomfort to the wearer since it is then far too tight on the eye.

The present invention solves the long extant problem of "flare" or "ghosting," and is useful both in the initial manufacture of the lens and after the lens has reached the fitter or wearer. Essentially, the problem has been solved by making a part of or the entire nonoptic zone nontransparent. The preferred manner of accomplishing this highly desirable result is disclosed herein, although it is recognized that there are other modes of achieving the same; for example, I have conceived of using a coating of ink or metallic layer of aluminum for this purpose and have made contact lenses accordingly which have eliminated "flare" and "ghosting." However, this was cosmetically undesirable because when so treated, the contact lens did not remain invisible when worn on the eye.

Accordingly, it is an object of this invention to provide a greatly improved contact lens which eliminates the phenomenon commonly referred to as "flare" or "ghosting," and retains the highly desirable cosmetic feature of being invisible when worn on the eye.

It is also an object of this invention to provide a novel process and apparatus for producing such improved contact lenses.

Further objects and advantages of the present invention will become apparent from a study of the following detailed description and accompanying drawings, wherein:

FIG. 7 is an elevational view, partially in cross section and with parts broken away, showing my lens holder within a conventional abrading device illustrating one step in my process;

FIG. 8 is a perspective view of my lens holder apparatus;

FIG. 9 is a vertical sectional view taken along line 9-9 of FIG. 8;

FIG. 10 is an exploded perspective view of the apparatus shown in FIG. 9; and

FIG. 11 is an elevational view, partially in section, showing the step of polishing the contact lens.

Figure 1:
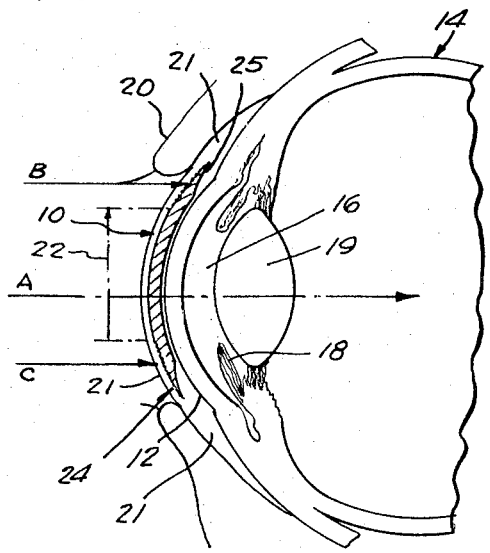
FIG. 1 is a vertical cross-sectional view showing an eye with a corneal contact lens constructed according to my invention mounted thereon in a "high-riding" position.
Figure 2:
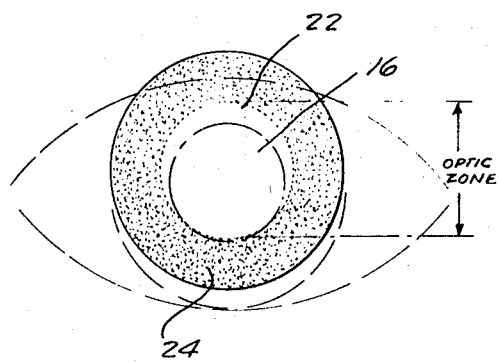
FIG. 2 is a front elevational view of the showing of FIG. 1.
Figure 3:
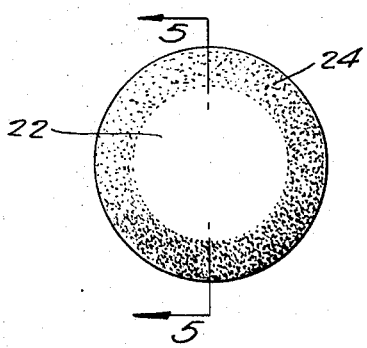
FIG. 3 is a plan view of my lens.
Figure 4:
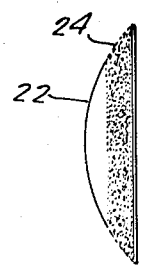
FIG. 4 is a side view of my lens.

Referring now to the drawings in more detail, wherein like reference numerals are used throughout to designate like elements, FIG. 1 shows a contact lens 10 mounted upon the cornea 12 of an eye 14 in substantial alignment with the pupil 16 defined by the iris 18 which is superimposed on the crystal line lens 19. Tear fluid above and below the contact lens 10 is shown at 21.

While it is desirable to mount a contact lens centrally on the cornea 12, the lens is often displaced for reasons given supra, and one of the offcenter positions is the "high-riding" position shown in FIG. 1, where the edge of the lens 10 is covered by the lid 20.

The lens 10 has a substantially concavo-convex configuration with a transparent centrally located optic zone or area 22 to permit the transmission of light, as shown by light ray A in FIG. 1, through the contact lens 10 and crystalline lens 19 to the retina, not shown.

Figure 5:
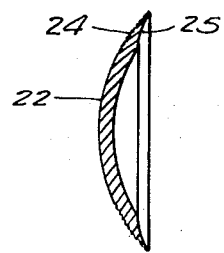
FIG. 5 is a cross-sectional view of my lens taken along line 5-5 of FIG. 3.
Figure 6:
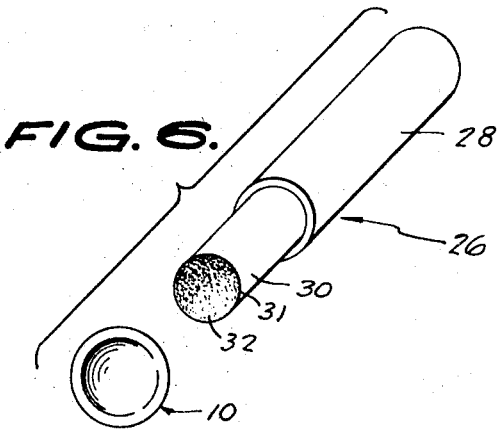
FIG. 6 is an exploded perspective view showing my lens and a lens support.

Surrounding the optic zone 22 is an annular nonoptic zone or area 24 which extends from the optic zone 22 to the edge of the contact lens 10. The inner or concave surface of the zone 24 is hollowed out, at 25, around the periphery in the conventional manner for drainage and exchange of lacrimal fluid. The outer or convex surface of the nonoptic zone 24 is irregular in contour, as seen in FIGS. 1 and 5, so that light incident to this surface is both reflected and refracted irregularly. Such light, diagrammatically illustrated as rays B and C, does not pass through the contact lens 10, but is essentially destroyed at the surface of zone 24, through scattering and interference. Thus, zone 24 is nontransparent and will preclude light from being transmitted to the eye therethrough and it will be seen, therefore, that only light striking the transparent optic zone 22 will be transmitted to the eye, thereby avoiding any "flare" or "ghosting."

The preferred process and apparatus for achieving the irregular surface conformation of the nonoptic, nontransparent zone 24 will now be disclosed.

A corneal lens 10 is mounted upon a lens support or lap 26 which is generally cylindrical in shape and has a main body portion 28 and a reduced end portion 30 integral therewith. The free end 31 of the portion 30 carries a layer of suitable conventional double-sided adhesive tape 32 to which the contact lens may be quickly applied and removed without damage. The convex side of the contact lens 10 is applied to the free end 31 which is suitably cupped to receive it, as shown in FIG. 9. In practice, a variety of laps 26 are available, and the operator selects one which has a free end 31 corresponding in size to the portion of the contact lens 10 to be masked, which normally corresponds to the optic zone 22. The free end 31 of lap 26 is then inserted into a self-centering holder or base 34. The base 34 consists of a cylindrical sleeve 36 and an insert 38 of Teflon, or the like, carried therein with one end 40 of the insert 38 projecting beyond the end 42 of the sleeve 36. The insert 38 is provided with a longitudinally extending bore 44 which opens to both the end 40 and the end 46 of the insert 38. As shown in FIG. 9, one end 48 of the bore 44 is enlarged to receive the contact lens 10 and lap 26. Such end 48 is sufficiently large to receive any size contact lens and is conically shaped with its sidewalls converging inwardly from the end 40 of the insert to a point approximately midway between the ends 40 and 46 of the insert 38.

After the lap 26 has been inserted into the enlarged end 48 of the bore, it is held in axial alignment with the bore 44 by slipping a hollow open-ended cylindrical guide 50 over the lap 26 until the guide 50 abuts the end 42 of the sleeve 36 and is in axial alignment with the sleeve. An integral crossmember 52 bridges the guide 50 and is provided with a bore 54 which is aligned with the bore 44. As shown in FIGS. 8 and 9, the main body 28 of the lap 26 extends into and is received within the bore 44 so as to maintain the lap in axial alignment therewith. Lap 26 is then rotated to insure complete centering of the contact lens 10.

The guide 50 is then clamped to the base 34 by any suitable means, including, but not limited to the operator's hand, and the clamped apparatus 58, shown in FIGS. 8 and 9, is then inserted into an abrading chamber 56 in the path of a stream of air and abrasive under pressure, as will be seen in FIG. 7. The chamber 56 may be Model No. 179 of Pressure Blast Manufacturing Co., Inc., of Manchester, Connecticut. Various abrasives may be used, including crushed walnut shells, crushed pecan shells, rottenstone, pumice, and talcum powder. The abrasive stream is directed upon the exposed portion of the contact lens 10 in the manner illustrated by the arrows in FIG. 9. The abrasive particles striking the exposed portion of the lens create tiny macroscopic indentations and crenulations which coalesce to form a smooth, but highly irregular surface.

I have found that the time of exposure, pressure the abrasive stream, and material used may be varied. The following example has been found satisfactory and is merely illustrative of others:

time: 10—20 seconds

Pressure: 50—60 p.s.i.

Abrasive: "Shelblast–AD7BD" made by Agrashell, Inc. of Los Angeles, Cal.

The apparatus 58 is then withdrawn from the abrading chamber and disassembled by removing the guide 50 and then the lap 26, whereupon the contact lens 10 is removed from the lap 26. As seen in FIG. 11, lens 10 is then adhesively mounted on a holder 60 having a rotatable head 62, and the treated or unmasked surface of the lens is polished on a conventional rotatable soft buffing wheel or drum 64, which carries a suitable polishing medium, such as wet pure silk.

When the treated contact lens is inspected in air, the nontransparent nonoptic area 24 is visible as an annular band. Of course, this is not cosmetically desirable. However, when the lens is worn on the eye, the area 24 becomes essentially invisible because the tear fluid flows over and fills the macroscopic indentations. The difference in the indices of refraction of the lacrimal fluid and the contact lens, plus the highly irregular contour of the treated surface area 24 scatters the incident light and thereby prevents it from being transmitted directly through the lens.

There are certain situations when it is desirable to create an artificial pupil smaller than the natural pupil of the eye. In such cases, the masked optic area of the contact lens can be reduced, thereby leaving a larger treated nonoptic area. Accordingly, it will be recognized that the optic zone 22 and nonoptic zone 24 may be of various sizes and shapes to provide a transparent optic zone of any desired size or shape.

I claim:

1. A contact lens for wear on the eye, said lens being of one piece construction of the same material throughout, the material having a refractive index differing from that of the eye lacrimal fluid, said lens being substantially concavo-convex throughout its configuration, the concave surface being optically smooth and adapted to fit on the eye, said lens having a transparent centrally located optic area and a nonoptic area formed on the convex surface and surrounding said optic area, said nonoptic area having light-scattering means of macroscopic proportions formed only upon its convex surface, said light scattering means being formed by bombarding said nonoptic area with finely divided particles of a soft abradant randomly gas-born in a jet of high velocity for a time of approximately 10—20 seconds and at a pressure of approximately 50—60 p.s.i., said abradant being selected from the group consisting of one or more of the following: crushed walnut shells, crushed pecan shells, rottenstone, pumice and talcum powder; whereby any light striking said nonoptic area will be transmitted to the eye by irregular refraction.

2. The contact lens of claim 1 in which said light-scattering means on said nonoptic area are polished by buffing with a wet pure silk polishing medium.